United States Patent [19]

Antes

[11] Patent Number: 4,544,266
[45] Date of Patent: Oct. 1, 1985

[54] APPARATUS AND A METHOD FOR TESTING THE AUTHENTICITY OF DOCUMENTS

[75] Inventor: Gregor Antes, Zürich, Switzerland

[73] Assignee: LGZ Landis & Gyr Zug AG, Zug, Switzerland

[21] Appl. No.: 425,455

[22] Filed: Sep. 28, 1982

[30] Foreign Application Priority Data

Oct. 27, 1981 [CH] Switzerland .................. 6836/81

[51] Int. Cl.⁴ .............................................. G06K 7/10
[52] U.S. Cl. ...................................................... 356/71
[58] Field of Search ............... 356/71, 354, 355, 356; 283/85, 86, 91; 250/566, 237 G

[56] References Cited

U.S. PATENT DOCUMENTS

| | | | |
|---|---|---|---|
| 3,735,374 | 5/1973 | Rembault | 356/71 |
| 4,129,382 | 12/1978 | Greenaway | 356/71 |
| 4,140,373 | 2/1979 | Rull | 283/86 X |

Primary Examiner—Vincent P. McGraw
Attorney, Agent, or Firm—Ernest F. Marmorek

[57] ABSTRACT

In an apparatus and a method for examining the authenticity of a document, which includes at least a machine-readable authenticity feature in the form of an optical microstructure for diffracting at least one component of a beam of light rays which has a wavelength of a first predetermined value and impinges on the microstructures along a predetermined direction, a light source for emitting the beam of light rays, and wherein the components of the light rays diffracted from the microstructure have an intensity distribution defining an effective center line of "gravity" along one direction of diffraction, a light-sensing device for sensing the light rays diffracted from the microstructure and for generating electrical signals from the sensed light rays, and an evaluator for processing the electrical signals generated by the light sensor, and for deriving from information contained in the processed electrical signals a YES/NO decision whether the document is authentic or not, there is provided a control connected to the light source so that the light source switches the wavelength of the beam of light rays from the first predetermined value to a second predetermined value, and wherein the evaluator provides the YES decision if the shift between the center lines of gravity of the intensity distribution of the components of the light rays diffracted by the microstructure lies between predetermined limits.

17 Claims, 8 Drawing Figures

APPARATUS AND A METHOD FOR TESTING THE AUTHENTICITY OF DOCUMENTS

CROSS-REFERENCE TO RELATED APPLICATIONS

Reference should be had to copending application Ser. No. 534,201, entitled "Document Having a Security Feature and Method for Determining the Authenticity of the Document" assigned to the assignee of the present invention.

BACKGROUND OF THE INVENTION

Most of the presently used documents, such as, for example, bank notes, credit cards, identity cards, rail or airline tickets, checks and alike can be forged by means of modern copying methods at not too great an expense. Many proposals have been made having as an object to record on such documents machine-readable authenticating features, which increase the expense for anyone attempting to forge such documents, and thus reduce the probability of forgery. The probability of forgery is further reduced, if authenticating features in the form of optical microstructures are embedded in the document, which diffract light reaching the document in a characteristic manner. Such microstructures, such as, for example, holographically manufactured structures, phase diffraction gratings and kinoforms can only be manufactured at a high technical expense, and cannot be reproduced with conventional reproduction processes.

Microstructures are immediately impressed or embossed on a substrate where documents include substrates of thermoplastic material as taught, for example, in British Pat. No. 1,502,460. Greenaway, in U.S. Pat. No. 4,184,700 teaches the coating of paper documents with a thermoplastic coating or layer prior to the embossing of microstructures with optical markings. Greenaway, in U.S. Pat. No. 4,119,361, teaches the use of protective layers in the form of a laminated foil to protect a microstructure, while a lacquer layer is disclosed in Swiss Application 6382/80-9 to protect a microstructure. The protective layer serves the further purpose of hiding the microstructure from the human eye.

When subjecting such documents to authentication tests by machine, the microstructure is illuminated by a bundle of read-rays, the rays having a predetermined wavelength, or a predetermined narrow wavelength region. One or several components of the read-rays diffracted by the microstructure are sensed by means of a light sensor, and processed by an electronic evaluation device test to determine whether the intensity or the intensity ratio of these components lies within expected limit values, as taught by Greenaway in U.S. Pat. No. 4,129,382.

SUMMARY OF THE INVENTION

One of the principal objects of the invention is to devise an apparatus for testing the authenticity of documents; the apparatus is required to provide a particularly high reliability in testing for authenticity and is required to be substantially free from any disturbing influences.

This object is attained in an apparatus for examining the authenticity of a document, including at least a machine-readable authenticity feature in the form of an optical microstructure for diffracting at least one component of a beam of light rays having a wavelength of a first predetermined value and impinging on the microstructure along a predetermined direction, a light source for emitting the beam of light rays, the components of the light rays diffracted from the microstructure having an intensity distribution defining an effective center line of "gravity" along one direction of diffraction, light-sensing means for sensing the light rays diffracted by the microstructure and generating electrical signals from the sensed light rays, and evaluating means for processing the electrical signals generated by the light sensing means, and for providing from information contained in the processed electrical signals a YES/NO decision whether the document is authentic or not, by providing control means connected to the light source for the control thereof so that the light source switches the wavelength of the beam of light rays from the first predetermined value to a second predetermined value, and wherein the evaluating means provide the YES decision if the center line of gravity of the intensity distribution of the components of the light rays diffracted by the microstructure at the second predetermined wavelength value lies along a direction different from the direction of the components of the light rays diffracted by the microstructure at the first predetermined wavelength value.

As a result of the inventive device, forgeries can be detected, where an attempt is made to deceptively pretend that a microstructure is present by the use of nondispersive optical deflection elements. Furthermore, dispersive disturbing influences cannot be eliminated by such an attempted deceptive practice.

Other objects of the invention will in part be obvious, and will in part appear hereinafter.

BRIEF DESCRIPTION OF THE DRAWINGS

For a fuller understanding of the nature and objects of the invention, reference should be had to the following detailed description, taken in connection with the accompanying drawings in which.

DESCRIPTION OF THE PREFERRED EMBODIMENTS

Figure 1:
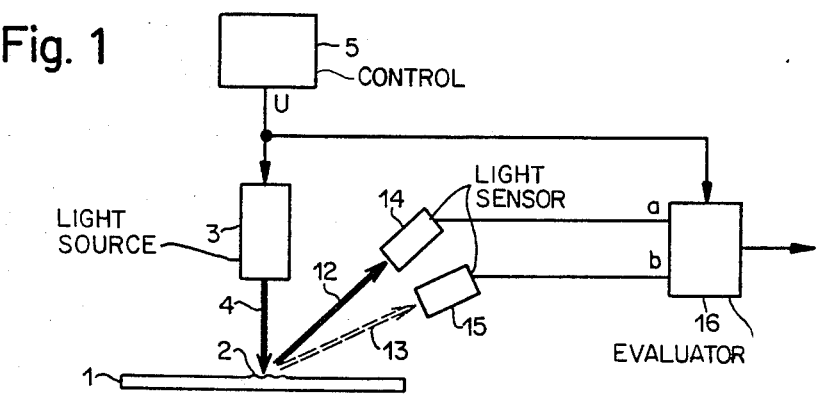
FIG. 1 is a block-schematic diagram of an apparatus for testing the authenticity of documents.

Referring now to the drawings, and in particular, to FIG. 1, there is shown a document 1 which can, for example, be a bank note, a credit card, an identity card, a railroad ticket, a check or the like, and which contains at least one authenticating feature in the form of an optical microstructure 2. The microstructure 2 is of a type so that a light ray incident thereon diffracts the incident light ray in at least one predetermined direction. Such microstructures, such as, for example, holograms, diffraction gratings, and kinoforms can be implemented by embossment of a thermoplastic layer of the document 1, and can be protected by a (non-illustrated) foil laminated onto the thermoplastic layer, or by a lacquer layer coated onto the microstructure.

A light source or illuminating device 3 passes a beam of read-rays, such as a beam of light rays 4, which beam has only a very small cross section, and only a small divergence or convergence, onto at least a partial surface of the microstructure 2. The light source 3 may be controlled by a control device 5 so that the wavelength of the beam of read light-rays 4 may be switched between a first value $\lambda_1$ and a second value $\lambda_2$, without the central axis of the read light-ray beam 4, and the intensity distribution thereof being disturbed in a plane perpendicular to the axis of the beam of rays. So that the wavelength can be switched in the aforedescribed manner, the control device 5 supplies a control voltage U to the illuminating device 3, which voltage U may assume two different values. This switching is preferably accomplished alternately, so that the detection described later can be accomplished by way of an alternating current.

Figure 2:
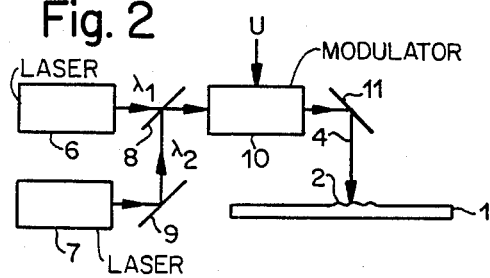
FIG. 2 is a block-schematic diagram of an illumination device.

An implementation of the light source or illuminating device 3 is shown in FIG. 2. Two lasers 6 and 7 generate light rays having wavelengths $\lambda_1$ or $\lambda_2$, by means of a semi-transparent mirror 8, so that the ray of the laser 6 and the ray of the laser 7 deflected from a mirror 9 are superimposed. An electro-optical modulator 10, controlled alternately by the voltage U inhibits one of the two rays at least partially, and deflects the other ray through a mirror 11 onto the microstructure 2 of the document 1.

Two light diodes can be used in lieu of the lasers 6 and 7. If the lasers 6 or 7, or the light diodes are driven alternately by pulses, then the electro-optical modulator 10 may be dispensed with.

The component of the read-ray beam 4 diffracted by the microstructure 2 is diffracted in at least one predetermined direction. This direction is dependent on the wavelength of the read-ray beam 4. At the wavelength $\lambda_1$, there is generated, for example, a light ray 12, and at the wavelength $\lambda_2$ a light ray 13 (FIG. 1). The directions of the center line of "gravity" of the intensity distribution of the components diffracted by the microstructure 2 therefore alternate between two predetermined angles.

A light sensor arrangement, which, in the example shown in FIG. 1, consists of two light sensors 14 and 15, senses the light rays 12 and 13 diffracted from the microstructure 2. An evaluator 16 serves to evaluate the electrical signals "a" and "b" supplied by the light sensors 14 and 15, respectively, and for deriving a YES/NO decision. The evaluator 16 is also controlled by the control voltage U, and generates a YES signal on its output, if the center line of "gravity" of the intensity distribution of the components diffracted by the microstructure 2 of the read-ray beam 4 has a direction at the value of $\lambda_2$ of the wavelength different from the direction at the value of $\lambda_1$ of that wavelength. The intersection of the center line of gravity with the surface of the light sensor defines on the light sensor a "center of gravity" of the intensity distribution of these components.

If the light sensors 14 and 15, according to FIG. 1, are so arranged that the light sensor 14 senses the light ray 12, and the light sensor 15 the light ray 13, then a YES signal is generated, and therefore the document 1 is considered genuine, if the center line of "gravity" of the intensity distribution of the bundle of the diffracted light rays at the wavelength $\lambda_1$ lies along a first predetermined direction and lies along a second predetermined direction at the value of $\lambda_2$. A document which does not include any microstructure 2 having the predetermined dispersive properties is therefore rejected.

Figure 3:
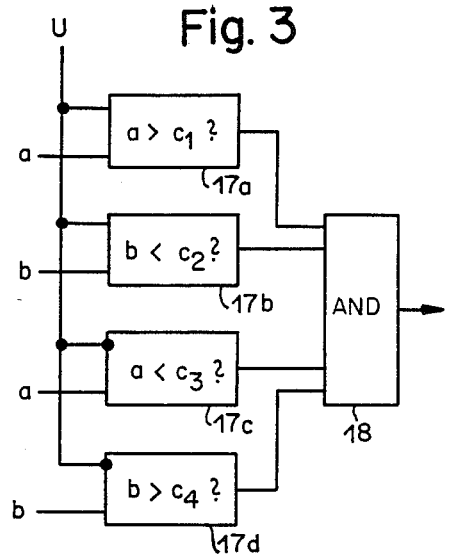
FIG. 3 is a block-schematic diagram of a first version of an evaluation apparatus.

In FIG. 3, there is shown a simple implementation of an evaluator including four comparators, 17a through 17d and an AND gate 18. The comparators 17a through 17d are controlled by a control voltage U, so that the comparator 17a compares the signal "a" at the wavelength $\lambda_1$ with a threshold value $c_1$, and so that the comparator 17b compares the signal "b" with a threshold value $c_2$, while at the wavelength $\lambda_2$ the comparator 17c compares the signal "a" with a threshold value "$c_3$", and comparator 17d compares the signal "b" with a threshold value $c_4$. If, at $\lambda_1$ $a > c_1$, and $b < c_2$ and if, at $\lambda_2$ $a < c_3$, and $b > c_4$, then at the output of the AND gate 18 a YES signal appears.

Figure 4:
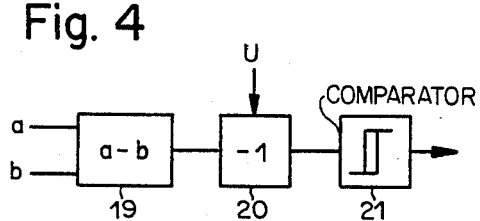
FIG. 4 is a block-schematic diagram of a second version of an evaluation apparatus.

The evaluator shown in FIG. 4 consists of a difference amplifier 19, an inverter 20 controlled by the control voltage U, and a comparator 21. At the wavelength $\lambda_1$ the difference a-b of the signals "a" and "b", and the wavelength $\lambda_2$ the difference of the signals b-a is supplied to the comparator 21, and compared therein with stored limit values. If the difference is greater than the limit value in the case of $\lambda_1$ as well as in the case of $\lambda_2$, then the comparator 21 supplies a YES signal. Instead of the difference a-b or b-a, it is also possible to form the quotient a/b or b/a, and compare it to the stored limit values. It will be easily seen that non-dispersive disturbing influences, namely disturbing influences independent of the wavelength, such as refractions from the protecting layer covering the microstructure 2, will be eliminated by obtaining the difference, or the quotient of the signals "a" and "b".

Some implementation examples will now be explained with the aid of FIGS. 5 through 8, wherein the relative displacement of the center of gravity of the intensity distribution of the diffracted light rays, but not the absolute direction of the center line of gravity of the intensity distribution of the diffracted light rays is detected, (which occurs when switching wavelengths) and wherein the evaluator provides a YES signal when the difference of the cartesian coordinates (x, y) or the difference of the polar coordinates (r, y) of the centers of gravity of the distribution of the diffracted light rays on a detector surface lies within predetermined limits.

Figure 5:
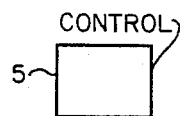
FIG. 5 is a first version of an apparatus for testing the authenticity of documents.

In FIG. 5 the same reference numerals have been employed for parts equivalent to those of FIG. 1. The microstructure 2 of the document 1 is illuminated in the same manner with a read-ray beam 4 as in the arrangement according to FIG. 1. A single axis position sensing detector 22 serves as a light sensing arrangement, which is positioned in such a manner that both the light ray 12 as well as the light ray 13 can impinge on a surface thereof; the detection axis of the detector 22 denoted by "x" lies in a common plane of both light rays 12 and 13. Such position sensors (for example, of the type PIN-LSC/30D of United Detector Technology, Inc., with the associated amplifier 301B-AC of the same manufacturer) have two outputs, wherein the first output 23 provides a signal being proportional to the x coordinate of the center of gravity of the intensity distribution of the diffracted light-rays, as well as proportional to the intensity I of the diffracted light rays impinging on the detector surface, while the second output 24 provides an electrical signal proportional to that intensity I. Upon alternate switching of the wavelength, and a corresponding alternating displacement of the center of gravity of the intensity distribution of the diffracted light rays along the x-axis, there therefore appears at the output 23 an electrical signal x (t) . I (t), and at the output 24 there appears an electrical signal I (t), t denoting time.

The outputs 23 and 24 of the position sensor 22 are connected to processing means, such as a divider 25, at whose output there appears an electrical position signal x (t), which represents a linear measure of the x-coordinates of the center of gravity of the intensity distribution of the diffracted light rays, and is independent of the intensity I of the diffracted light rays. The output of the divider 25 is connected to a detector 26, which is controlled by the control signal U, and which determines from the signal x(t) the x component of the displacement of the center of gravity of that intensity distribution, namely the amount $\Delta x$ and the sign of the displacement in the x-axis. The amount $\Delta x$ corresponds to the amplitude of the signal x(t). A lock-in amplifier is particularly suitable as a detector 26. The output of the detector 26 is coupled to a comparator 27, which compares the output signal $\pm \Delta x$ of the detector 26 with stored limit values, and provides a YES signal, if $\pm \Delta x$ lies within these limit values.

Figure 6:
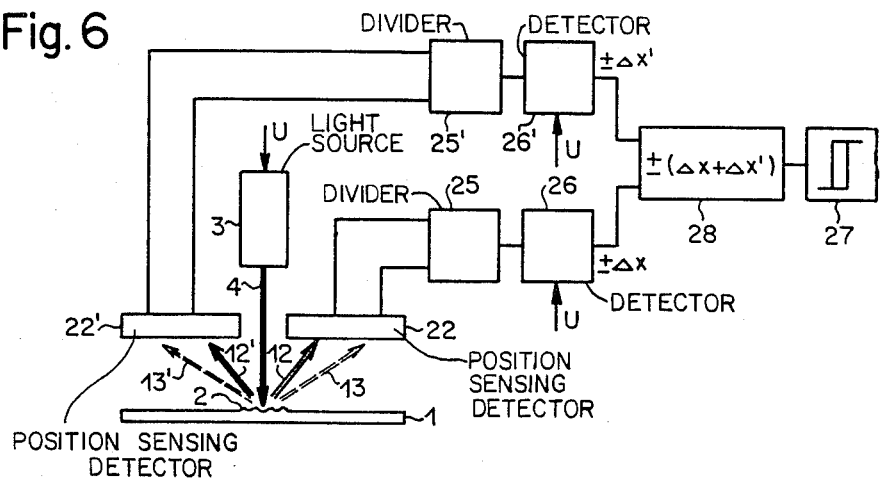
FIG. 6 is a second version of an apparatus for testing the automaticity of documents.

If the microstructure 2 is of the type that it diffracts the read-ray beam 4 in several predetermined directions, then instead of a single position sensor 22, several such position sensors can be employed. In FIG. 6 there is shown an example of examining the authenticity of a microstructure 2, where, in the case of the wavelength of the light rays being $\lambda_1$, there appears in addition to the light ray 12 a light ray 12' of the conjugate diffraction order, and in the case of the wavelength of the light rays being $\lambda_2$, there appears in addition to the light ray 13, also a light ray 13' of the conjugate diffraction order. The position sensor 22 detects the light rays 12 and 13, while a further position sensor 22' is supplied for the detection of the light rays 12' and 13'.

Both outputs of the position sensor 22' are connected to a divider 25', to which there is postcoupled a detector 26'. An adder 28 adds the output signal $\pm \Delta x$ of the detector 26, to the output signal $\pm \Delta x'$ of the detector 26. The sum signal $\pm (\Delta x + \Delta x')$ is compared the comparator 27 with the stored limit values.

Figure 7:
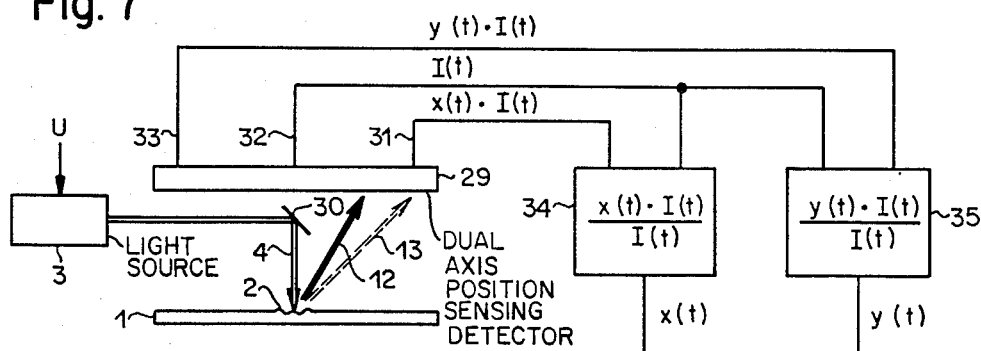
FIG. 7 is a third version of an apparatus for testing the authenticity of documents.

In the arrangement according to FIG. 7, there is provided for the detection of the light rays 12 and 13 a dual axis position sensing detector (for example, of the type PIN-SC/25 of United Detector Technology Inc.). This dual axis position sensor is disposed in a plane parallel to the document 1. A mirror 30 disposed between the document 1 and the position sensor 29 reflects the read light-ray beam 4 generated by the light source 3 perpendicular to, and coaxial with the position sensor 29 onto the microstructure 2. Similarly to the position sensor 22 (FIG. 5) the position sensor 29 has a first output 31, which provides an electrical signal proportional both to the x-coordinate of the center of gravity of the intensity distribution of the diffracted light rays, as well as to the intensity I of the light rays, and a second output 32 on which there appears an electrical signal proportional to that intensity I. A third output 33 of the position sensor 29 furnishes an electrical signal proportional to the y-coordinate of the center of gravity of the intensity distribution of the diffracted light rays, as well as to the intensity I of these light rays. During alternating switching of the wavelength, there therefore appear the signals x(t).I(t), y(t).I(t), and I(t). The outputs 31 and 32 are connected to a divider 34, and the outputs 32 and 33 are connected to a divider 35, which supplies the electrical position signal x(t) and y(t). A detector 36 postcoupled to the divider 34 derives the x-component $\pm \Delta x$ of the displacement of the center of gravity of that intensity distribution, and a detector 37 postcoupled to the divider 35 derives the y-component $\pm \Delta y$ of that displacement. The detectors 36 and 37, as well as the detector 26 (FIG. 5) are supplied by the control voltage U, and may also be implemented as lock-in amplifiers. The outputs of the detectors 36 and 37 are connected to an arithmetic unit 38, which calculates the displacement of the center of gravity of the intensity $\Delta r$ and the azimuth $\rho$ of the displacement in polar coordinates from the cartesian x-component $\pm \Delta x$, and from the cartesian y component $\pm \Delta y$, for example, according to the relations:

$$\Delta r = \sqrt{\Delta x^2 + \Delta y^2}, \text{ and } \phi = \tan^{-1} \frac{\Delta y}{\Delta x}$$

A comparator 39 is connected to the arithmetic unit 38 for comparing the output signals of the arithmetic unit 38 with stored limit values.

Figure 8:
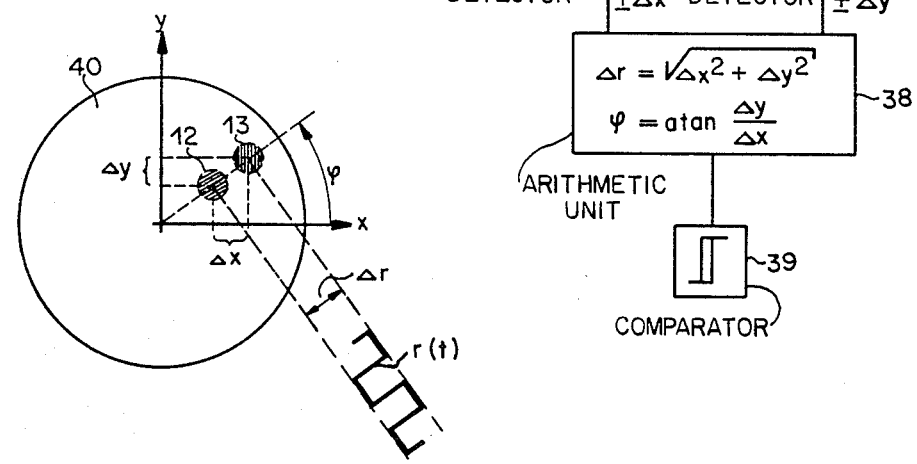
FIG. 8 is a detail of the block diagram of FIG. 7.

The diagram of FIG. 8 is a detail of FIG. 7, and serves to clarify the operation of the apparatus, according to FIG. 7. The reference numeral 40 denotes the detection surface of the position sensor 29. When the read light-ray beam 4 has a wavelength $\lambda_1$, the light ray 12 impinges on the detector surface 40, and when the read light-ray beam 4 has a value of $\lambda_2$, the light ray 13 impinges on the same detection surface 40. Switching of the wavelength results in the displacement of the center of gravity of the intensity by an amount $\Delta r$ at an azimuth angle $\rho$, where the amount $\Delta r$ is made up of the component $\Delta x$ in the x-axis, and the component $\Delta y$ in the y-axis. Here r(t) denotes the amplitude of the electrical signal as a function of time, which may be formed in the arithmetic unit 38 from the signals x(t) and y(t), and which represents the displacement of the center of gravity of the intensity distribution of the diffracted light rays as a function of time.

The apparatus according to FIG. 7 has the particular advantage that it is universally applicable for various diffraction characteristics of the microstructure 2, as the diffraction characteristics during construction of the apparatus need not be known, and only the limit values which have to be compared with the output signals of the arithmetic unit 38 in the comparator 39 need to be matched to the authenticity sample to be tested. When the light rays from the light source 3 impinge upon the document 1 approximately at right angles, a so-called Blaze effect microstructure 2 is required, so that any disturbing spurious radiation of the conjugate diffraction order are largely suppressed, as otherwise, upon simultaneous detection of light rays appearing both at the normal and at the conjugate diffraction order at the same intensities, the common center line of gravity of the intensity distribution of both rays would be wavelength-invariant. For examining the authenticity of microstructures without a Blaze effect, there is required either an illuminating arrangement emitting light rays at an angle to the plane of the microstructure, or an asymmetrical arrangement of the position sensor 29.

In lieu of the continuous position sensors 22, 22' and 29, it is also possible to use a light sensor matrix disposed in single rows, or in a plurality of rows, where the coordinates of the center of gravity of the beam of light rays is determined by means of an evaluation logic from the electrical signals of the individual light sensors, and is represented in digital form.

During the aforesaid explanation, it has been assumed that the document 1 is stationary while being examined for authenticity. However, by means of a (non-illustrated) transport arrangement, a relative movement between, on one hand, of the document, and on the other hand, of the light source as well as of the light sensor arrangement, can be generated, so as to scan the microstructure 2 along a measurement track. If the diffraction characteristics of the microstructure 2 is changeable along the measurement track, then the switching over of the wavelength must be accomplished at a high frequency in relation to the change of the diffraction characteristics, and the output signals of the detectors 26, 26', 36 and 37, or of the arithmetic unit 28, can then be compared in the comparators 27 and 39 with the limit functions, which correspond to the desired value of the signals $\Delta x$, $\Delta y$, $\Delta r$ and $\Delta \rho$. Here it is advantageously possible to also test whether the phase position of the displacement of the center line of gravity of the intensity distribution of the diffracted light rays along a locus relative to the phase of the switching of the wavelength, lies within predetermined limits.

The aforedescribed implementations, particularly the detection of the relative displacement of the center of gravity of the intensity distribution of the diffracted light rays permit a reliable examination for authenticity of a document, even when the optical effective signals are weakened by any disturbing influences of whatever kind. The following cases may arise:

1. A roughening of the protective layer covering the microstructure 2, which may have occurred during production, or as a result of aging, results in the broadening of the diffraction maxima. This leads, on one hand, to weakening of the effective signals, and on the other hand, the direction of the diffraction can only be determined with less accuracy. As the position sensors 22 and 29 sense the entire cross-section of the beam of rays, the determined coordinate of the center of gravity of the intensity does not change, however.

2. A defective positioning of the document, namely any lack of the document extending along a single plane, any folds, and wave-like non-uniformities lead to uncertain diffraction directions. Although the absolute angle of diffraction changes, when the angle of diffraction and the wavelength differences are not too large, the angular differences between the light rays 12 and 13, and therefore the relative displacement of the center, or center line of gravity of the intensity is invariant, in a first approximation.

3. Reflections from the surface of the protective layer may appear as disturbing signals in the aperture of the light-sensing apparatus. Such reflections from smooth or even rough non-diffraction causing surfaces are however, wavelength-invariant both concerning their intensities, as well as concerning their distribution in direction, and their influence is eliminated during the detection process.

4. Other disturbing signals, not resulting from diffraction, for example, locally varying reflectivities of the substrate of the microstructure 2, color patterns superimposed on the microstructure, or scratches, although changing the total intensity of the light reflected from the document, do not, nevertheless, change the displacement of the center of gravity, when the wavelength is switched.

5. If laser light is used for scanning, then socalled granulation effects appear, which make determination of the direction of diffraction more difficult, and also result in disturbing noise signals. But even such granulation effects do not change the location of the center of gravity of the intensity in a first approximation.

I wish it to be understood that I do not desire to be limited to the exact details of construction shown and described, for obvious modifications will occur to a person skilled in the art.

Having thus described the invention, what I claim as new and desire to be secured by Letters Patent is as follows:

1. In an apparatus for examining the authenticity of a document, including at least a machine-readable authenticity feature in the form of an optical microstructure for diffracting at least one component of a beam of light rays having a central axis, an intensity distribution and a wavelength of a first predetermined value and impinging on said microstructure along a predetermined direction, a light source for emitting said beam of light rays, the components of the light rays diffracted from said microstructure having an intensity distribution defining an effective center of intensity distribution along one direction of diffraction, light-sensing means for sensing the light rays diffracted by said microstructure and generating electrical signals from the sensed light rays, and evaluating means for processing the electrical signals generated by said light sensing means, and for providing from information contained in the processed electrical signals a YES/NO decision whether the document is authentic or not, in combination, control means connected to said light source for the control thereof so that said light source switches the wavelength of said beam of light rays from said first predetermined value to a second predetermined value, and being free from disturbing the central axis and the intensity distribution of said beam, said evaluating means providing said YES decision if the effective center of the intensity distribution of the components of the light rays diffracted by said microstructure at said first predetermined wavelength value lies along a first prearranged direction, and that of the components of the light rays at said second predetermined wavelength value lies along a second predetermined direction.

2. The apparatus as claimed in claim 1, wherein the wavelength of said beam of light rays is alternately switched between said first and second values.

3. The apparatus as claimed in claim 1, wherein said evaluating means provides said YES decision if the center of the intensity distribution of the components of the light rays at said first predetermined wavelength value lies along a first prearranged direction, and that of the components of the light rays at said second predetermined wavelength value lies along a second predetermined direction.

4. The apparatus as claimed in claim 1, wherein said light sensing means includes at least a single axis electro-optical position sensor.

5. The apparatus as claimed in claim 1, wherein said light sensing means includes a dual axis electro-optical position sensor.

6. The apparatus as claimed in claim 1, wherein said evaluating means includes a detector surface, and wherein the components of said beam of light rays diffracted from said microstructure and having said first predetermined wavelength value impinge on said detector surface at a first region defining a center of intensity distribution at said first predetermined wavelength value, and wherein the components of said beam of light rays diffracted from said microstructure and having said second predetermined wavelength value impinge on said detector surface at a second region defining said center of intensity distribution at said second predetermined wavelength value, said regions being displaced from one another by a certain displaced amount, and wherein said YES decision is provided upon said displaced amount being within predetermined limits.

7. In an apparatus for examining the authenticity of a document, including at least a machine-readable authenticity feature in the form of an optical microstructure for diffracting at least one component of a beam of light rays having a central axis, an intensity distribution and a wavelength of a first predetermined value, and impinging on said microstructure along a predetermined direction, a light source for emitting said beam of light rays, the components of the light rays diffracted from said microstructure having intensity distribution defining an effective center of intensity distribution along one direction of diffraction, light-sensing means for sensing the light rays diffracted by said microstructure and generating electrical signals from the sensed light rays, and evaluating means for processing the electrical signals generated by said light sensing means, and for providing from information contained in the processed electrical signals a YES/NO decision as to whether the document is authentic or not, in combination,
control means connected to said light source for the control thereof so that said light source switches the wavelength of said beam of light rays from said first predetermined value to a second predetermined value, and being free from disturbing the central axis and the intensity distribution of said beam;
said light sensing means including at least an electro-optical position sensor having a detector surface, wherein the components of said beam of light rays diffracted from said microstructure and having said first predetermined wavelength value impinge on said detector surface at a first region defining said effective center of the intensity distribution at said first predetermined wavelength value, and wherein the components of said beam of light rays diffracted from said microstructure and having said second predetermined wavelength value impinge on said detector surface at a second region defining an effective center of the intensity distribution at said second predetermined wavelength value, said regions being displaced from one another by a certain displaced amount, said evaluating means providing said YES decision if said displaced amount lies within predetermined limits.

8. The apparatus as claimed in claim 7, wherein any region on said detector surface is defined by an x-coordinate and a y-coordinate, or alternately by radial coordinate and by an azimuthal angle coordinate, and wherein said displaced amount is defined by a difference of corresponding of said x-coordinates and corresponding of said y-coordinates, or alternately by a difference of corresponding of said radial coordinates and corresponding of said azimuthal angle coordinates, and wherein said predetermined limits include at least one of said coordinate difference.

9. The apparatus as claimed in claim 8, wherein said position sensor is a continuous position sensor having at least two outputs, one of said outputs providing an electrical signal being proportional to the x-coordinate of the effective center of the intensity distribution on said detector surface, as well as being proportional to the intensity of said components of said beam of light rays impinging on said detector surface, the other output providing an electrical signal being proportional to the intensity of said components of said beam of light rays impinging on said detector surface, and wherein said evaluating means include processing means connected to said outputs for determining said displaced amount.

10. The apparatus as claimed in claim 9, wherein said processing means includes dividing means connected to said outputs, and a detector postcoupled to said dividing means, and wherein said displaced amount is said difference of correspondence of said x-coordinates.

11. The apparatus as claimed in claim 9, wherein said position sensor is a dual axis sensor having another output, said other output providing an electrical signal being proportional to the y-coordinate of the effective center of the intensity distribution on said detector surface, as well as being proportional to the intensity of said components of said beam of light rays impinging on said detector surface, and wherein said evaluating means include processing means connected to said outputs for determining said displaced amounts.

12. The apparatus as claimed in claim 11, wherein said processing means include dividing means connected to said outputs, and detectors postcoupled to said dividing means, and wherein said displaced amounts are said difference of correspondence of said x-coordinates and said difference of corresponding of said y-coordinates.

13. The apparatus as claimed in claim 12, further comprising an arithmetic unit connected to said detectors for determining from the difference of corresponding of said x-coordinates and from the difference of corresponding of said y-coordinates the difference of corresponding of said radial coordinates, and the difference of corresponding of said azimuthal angle coordinates.

14. The apparatus as claimed in claim 13, further comprising comparator means postcoupled to said arithmetic unit for comparing the output of said arithmetic unit with predetermined limit values.

15. The apparatus as claimed in claim 12, further comprising comparator means postcoupled to said detectors for comparing the output of said detectors with predetermined limit values.

16. The apparatus as claimed in claim 7, wherein the wavelength of said beam of light rays alternate at a predetermined switching frequency between said first and second values, said switching frequency being defined by a rate of phase change as a function of time, and wherein said effective center of the intensity distribution moves along a locus in dependence of said first and second predetermined wavelength values, and is defined at a given instant of time by a phase position in said locus, and further comprising transport means for generating a relative movement between said document, on one hand, and said light source and said light-sensing means, on the other hand, and wherein said evaluating means generates said YES signal upon the phase position of said effective center of intensity distribution being within predetermined limits with respect to the phase of said switching frequency.

17. In a method of examining the authenticity of a document including at least a machine-readable authenticity feature in the form of an optical microstructure the steps comprising alternately illuminating said microstructure by first and second beams of light rays at a predetermined direction, each having components diffracted from the microstructure at an intensity distribution defining an effective "center line of the intensity distribution" along one direction of diffraction, sensing an angular difference between said directions of diffraction, and deciding that the document is authentic if said angular difference lies between predetermined limits.

* * * * *